Patented Oct. 27, 1953

2,657,191

UNITED STATES PATENT OFFICE 2,657,191

POLYMERIZATION OF ACRYLONITRILE IN THE PRESENCE OF PREFORMED INTERPOLYMERS

Harry W. Coover, Jr. and Joseph B. Dickey, Kingsport, Tenn., assignors to Eastman Kodak Company, Rochester, N. Y., a corporation of New Jersey No Drawing. Application December 1, 1950, Serial No. 198,762

18 Claims. (Cl. 260—45.5)

This invention relates to the polymerization of acrylonitrile in the presence of preformed interpolymers, and to articles obtained therefrom.

In our copending application Serial No. 164,854 filed May 27, 1950, we have shown that valuable polymer products can be obtained by polymerizing acrylonitrile in the presence of preformed homopolymers of various unsaturated monomeric compounds.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 per cent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

We have now made the unusual and valuable discovery that stable solutions of acrylonitrile polymers which do not separate into distinct layers on standing, and from which fibers of homogeneous character can be spun, can be prepared by polymerizing acrylonitrile in the presence of preformed interpolymers which have not been separated from their polymerization medium prior to the addition of monomeric acrylonitrile. These fibers are characterized by a softening point higher than the interpolymers referred to above, and do not exhibit the segmentation defect shown by many of the fibers prepared from certain prior art materials comprising polyacrylonitrile.

It is known that polymers of acrylonitrile can be prepared by interpolymerizing acrylonitrile with a monoethylenically unsaturated compound and adding additional acrylonitrile during the course of the polymerization. The interpolymers thus obtained are subject to many of the deficiencies of the interpolymers referred to above in that their softening points are too low to permit their use in the preparation of synthetic fibers and yarns. Our new polymeric compositions are distinguished therefrom in that the interpolymerization of the original polymerization mixture of our invention is substantially complete before the added acrylonitrile is subjected to polymerization conditions. The acrylonitrile thus is able to extend the length of the interpolymer chain with units consisting entirely of acrylonitrile, and the product has the valuable tenacity and high-softening properties of polyacrylonitrile, while the new and important property of dye susceptibility is imparted thereto.

It is, therefore, an object of our invention to provide acrylonitrile polymer compositions. A further object of our invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent from a consideration of the following description and examples.

According to our invention, we provide polymer compositions comprising acrylonitrile by polymerizing acrylonitrile in the presence of a preformed interpolymer which has not been separated from its polymerization medium prior to the addition of the acrylonitrile. When the preformed interpolymer is separated from its polymerization medium, and redissolved in a solvent, or suspended in an aqueous medium, all of the reactive groups in the interpolymer chain are apparently closed, or rendered inactive, and polymerization of the acrylonitrile with this separated interpolymer causes a substantial lowering of softening point in certain instances. When the acrylonitrile is added to the preformed interpolymer before separation of the interpolymer from the reaction medium, a certain number of groups in the interpolymer chain apparently remain reactive, and the acrylonitrile is able to increase the length of the interpolymer chain. The compositions obtained according to our invention are not to be confused with simple interpolymers which have a low softening point as has been noted above.

The preformed interpolymers which are useful in practicing our invention can be prepared by interpolymerizing monoethylenically unsaturated, polymerizable, organic compounds containing a

I.     —CH=C< group according to methods well known to the art. We have found that interpolymers especially useful in practicing our invention can be prepared by interpolymerizing from 1 to 10 parts by weight of one of the compounds selected from those represented by Formula I above with from 1 to 10 parts of a different monomeric compound selected from the acrylamides, acrylic esters, citraconamides, itaconamides, and vinyl esters. When from 1 to 20 parts by weight of acrylonitrile is added to the interpolymer, and the added acrylonitrile heated until polymerization is complete, particularly useful compositions are obtained. The final compositions containing from about 60 to 90 per cent by weight of acrylonitrile in the polymer molecule have been found to be especially useful as fiber-forming materials. Those compositions containing from about 5 to 60 per cent by weight of acrylonitrile in the polymer molecule have been found to be useful in compounding with polyacrylonitrile (homopolymer) to give compositions which are substantially homogeneous. Monomers, whose polymers were not heretofore compatible with polyacrylonitrile, can thus be polymerized according to our invention to give polymers which are compatible with polyacrylonitrile. The compositions containing from 5 to 60 per cent by weight of acrylonitrile can be added directly to polyacrylonitrile, or the compositions can be left in their reaction medium after polymerization is substantially complete, and sufficient acrylonitrile can be added to produce a final product containing from 60 to 90 per cent by weight of acrylonitrile (which composition is useful in the preparation of fibers of high softening point and ready susceptibility to dyeing), and the added acrylonitrile polymerized in the presence of this "active" polymer.

The acrylamides which can be advantageously used in our invention comprise those represented by the following general formula:

II.
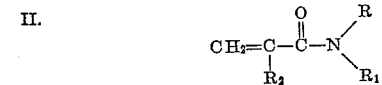

wherein R and $R_1$ each represents a hydrogen atom or alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4), and $R_2$ represents a hydrogen atom or a methyl group. Typical acrylamides include acrylamide, N-methylacrylamide, N-ethylacrylamide, N-isopropylacrylamide, N-n-butylacrylamide, methacrylamide, N-methylmethacrylamide, N-ethylmethacrylamide, N-isopropylmethacrylamide, N,N-dimethylacrylamide, N,N-diethylacrylamide, N,N-dimethylmethacrylamide, etc.

As acrylic esters, we can advantageously use those represented by the following general formula:

III.
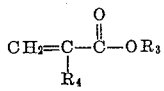

wherein $R_3$ represents an alkyl group, such as methyl, ethyl, n-propyl, isopropyl, n-butyl, isobutyl, etc. groups (e. g. an alkyl group of the formula $C_nH_{2n+1}$ wherein $n$ represents a positive integer from 1 to 4), and $R_4$ represents a hydrogen atom, a methyl group, an acylamino group wherein the acyl group is the acyl group of a saturated aliphatic carboxylic acid containing from 2 to 4 carbon atoms, such as acetyl, propionyl, butyryl, isobutyryl, etc. groups, or a carbalkoxylamino group wherein the alkoxyl group contains from 1 to 4 carbon atoms such as methyl, ethyl, n-propyl, isopropyl, n-butyl, isobutyl, etc. groups. Typical esters wherein $R_4$ represents a hydrogen atom or a methyl group include methyl acrylate, ethyl acrylate, n-butyl acrylate, isobutyl acrylate, methyl methacrylate, ethyl methacrylate, n-propyl methacrylate, isopropyl methacrylate, n-butyl methacrylate, isobutyl methacrylate, etc. Typical esters wherein $R_4$ represents an acylamino group include, for example, methyl α-acetaminoacrylate, ethyl α-acetaminoacrylate, n-propyl α-acetaminoacrylate, isopropyl α-acetaminoacrylate, n-butyl α-acetaminoacrylate, methyl α-propionaminoacrylate, ethyl α-propionaminoacrylate, n-butyl α-propionaminoacrylate, methyl α-n-butyraminoacrylate, ethyl α-n-butyraminoacrylate, isobutyl α-n-butyraminoacrylate, methyl α-isobutyraminoacrylate, ethyl α-isobutyraminoacrylate, n-propyl α-isobutyraminoacrylate, isobutyl α-isobutyraminoacrylate, etc. The acrylic esters wherein $R_4$ represents an acylamino group can be prepared according to the general method described in the copending application Serial No. 87,356, filed April 13, 1949, of H. W. Coover, Jr. and Joseph B. Dickey, now U. S. Patent 2,548,518, issued April 10, 1951. The process described in that application comprises reacting an alkali metal salt of an α-acylaminoacrylic acid with a dialkyl sulfate. The alkali metals useful for this process comprise those set forth in Serial No. 87,356 and also the alkali metal salt of the α-acylaminoacrylic acids described in the copending application Serial No. 132,216, filed December 9, 1949, of H. W. Coover, Jr. and Joseph B. Dickey, now U. S. Patent 2,622,074, issued December 16, 1952.

The acrylic esters wherein $R_4$ represents a carbalkoxylamino group can be prepared according to the method described in application Serial No. 132,217, filed December 9, 1949, now U. S. Patent 2,563,776, issued August 7, 1951. Typical esters wherein $R_4$ represents a carbalkoxylamino group include methyl α-carbomethoxyaminoacrylate, ethyl α-carbomethoxyaminoacrylate, isobutyl α-carbomethoxyaminoacrylate, methyl α-carbethoxyaminoacrylate, n-propyl α-carbethoxyaminoacrylate, isobutyl α-carbethoxyaminoacrylate, methyl α-carbopropoxyaminoacrylate, ethyl α-carbopropoxyaminoacrylate, isopropyl α-carbopropoxyaminoacrylate, n-butyl α-carbopropoxyaminoacrylate, methyl α-carbisopropoxyaminoacrylate, isobutyl α-carbisopropoxyaminoacrylate, methyl α-carbobutoxyaminoacrylate, n-propyl α-carbobutoxyaminoacrylate, methyl α-carbisobutoxyaminoacrylate, ethyl α-carbisobutoxyaminoacrylate, n-butyl α-carbisobutoxyaminoacrylate, etc.

As itaconamides, we can advantageously use those represented by the following general formula:

IV. 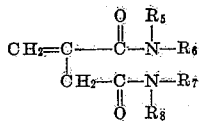

wherein $R_5$, $R_6$, $R_7$, and $R_8$ each represents a hydrogen atom, a methyl group, an ethyl group, etc. Typical itaconamides include itaconamide, N-methyl itaconamide, N-ethyl itaconamide, N,N'-dimethyl itaconamide, N,N'-dimethyl itaconmide, etc.

As citraconamides, we can advantageously use those represented by the following general formula:

V. 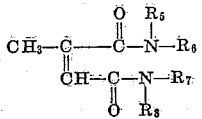

wherein $R_5$, $R_6$, $R_7$, and $R_8$ have the values given above. Typical citraconamides include citraconamide, N-methyl citraconamide, N-ethyl citraconamide, N,N'-dimethyl citraconamide, N,N'-diethyl citraconamide, etc.

As vinyl esters, we can advantageously employ those represented by the following general formula:

VI. 

wherein $R_9$ represents a hydrogen atom or an alkyl group, such as methyl, ethyl, n-propyl, isopropyl, etc. groups (e. g. an alkyl group containing from 1 to 3 carbon atoms).

The monoethylenically unsaturated, polymerizable organic compounds represented by Formula I above include the compounds represented by Formulas II, III, IV, V, and VI, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, butadiene, etc. Especially useful polymerizable compounds coming within the scope of Formula I comprise those containing a VII. 

group and an amido nitrogen atom, for example, the acrylamides.

In preparing the polymer compositions of our invention, the interpolymerization comprising the first step of our process is continued until substantially complete, i. e. further heating produces no additional polymerization, and the acrylonitrile monomer is then added and the polymerization continued until no further polymerization can be detected.

The polymerization is advantageously carried out in an aqueous medium, although other reaction media, such as organic solvents, can be employed; for example, a polymerization medium consisting of aqueous acetone, or other aqueous solvent can be used.

The polymerizations can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates, (e. g. alkali metal perborates, such as those of sodium and potassium, etc.), persulfates (e. g. alkali metal ammonium persulfate, etc.). Other catalysts such as the ketazines, azines, etc. can be used. The quantity of catalyst used can be varied, depending on the monomer, amount of diluent, etc. Sufficient catalyst can be used to interpolymerize the ethenoid monomers selected from those represented by the above general formulas, and the added monomeric acrylonitrile, or an amount of catalyst sufficient to interpolymerize only the ethenoid monomers can be used, and additional catalyst can be added with the acrylonitrile monomer to complete the polymerization. The catalyst added along with acrylonitrile may be the same catalyst that was used to polymerize the other ethenoid monomers. We have found that it is especially advantageous to use an amount of catalyst sufficient to interpolymerize only the initial monomers, and then upon addition of the acrylonitrile to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The following examples will serve to illustrate further the manner whereby we practice our invention.

Example 1

2.5 g. of N-methylmethacrylamide and 0.5 g. of acrylonitrile were dissolved in 75 cc. of water (distilled) containing 0.05 g. of ammonium persulfate and 0.05 g. of sodium bisulfite. The polymerization mixture was then heated at 35° C. for 12 hours. There were then added 7.0 g. of acrylonitrile, 0.1 g. of ammonium persulfate, and 0.1 g. of sodium bisulfite, and the polymerization mixture was heated at 35° C. for an additional 12 hours. The precipitated polymer was obtained in 85 per cent yield and contained 21 per cent by weight of N-methylmethacrylamide.

Fibers spun by extruding a solution of the polymer product in N,N-dimethylformamide into a precipitating bath had a softening point of 210° C. and showed excellent affinity for dyes.

Example 2

1.0 g. of acrylonitrile and 2.0 g. of N-methylacrylamide were added to 100 cc. of distilled water having dissolved therein 0.05 g. of potassium persulfate and 1.0 g. of orthophosphoric acid. The solution was then heated at 50° C. for 12 hours. There were added 7.0 g. of acrylonitrile, 0.1 g. of potassium persulfate, and 0.1 g. of sodium bisulfite to the cooled reaction mixture, and heating was resumed for 8 hours at 35° C. The precipitated polymer was obtained in 90 per cent yield and contained 18 per cent by weight of N-methylacrylamide.

Fibers spun by extruding a solution of the polymer product in N,N-dimethylformamide into a precipitating bath had a softening point of 220° C. and showed excellent dye-susceptibility.

Example 3

1.0 g. of methacrylamide and 1.0 g. of N,N-dimethylacrylamide were added to 50 cc. of water containing 0.05 g. (calculated as 100 per cent) of hydrogen peroxide and 0.5 g. of oxalic acid, and the solution was heated at 50° C. for 12 hours. The solution was cooled to room temperature and 8.0 g. of acrylonitrile and 0.1 g. (calculated as 100 per cent) of hydrogen peroxide were added. Heating was then continued for an additional 16 hours at 50° C. The precipitated polymer was obtained in an 85 per cent yield and contained 8.0 per cent by weight of methacrylamide and 9.0 per cent by weight of N,N-dimethylacrylamide.

Fibers spun by extruding a solution of the polymer product in N,N-dimethylformamide into a precipitating bath had a softening point of 185° C. and showed excellent affinity for dyes.

Example 4

1.0 g. of N,N'-dimethylitaconamide and 1.5 g. of acrylamide were added to 100 cc. of distilled water having dissolved therein 0.05 g. of ammonium persulfate and 0.05 g. of sodium bisulfite. The solution was then heated at 40° C. for 12 hours, at the end of which time the solution was cooled to room temperature. There were then added 7.5 g. of acrylonitrile, 0.1 g. of ammonium persulfate and 0.1 g. of sodium bisulfite, and the reaction mixture was heated an additional 12 hours at 35° C. The precipitated polymer was obtained in 92 per cent yield and contained approximately 9 per cent by weight of N,N'-dimethylitaconamide and 12 per cent by weight of acrylamide.

Fibers spun by extruding a solution of the polymer product in N,N-dimethylformamide into a precipitating bath had a softening point of 220° C. and showed good affinity for dyes.

Example 5

1.0 g. of methyl methacrylate and 2.0 g. of N-methylacrylamide were dissolved in 50 cc. of acetonitrile containing 0.05 g. of benzoyl peroxide, and the solution was heated at 50° C. for 24 hours. The solution was cooled to room temperature and 7.0 g. of acrylonitrile and 0.1 g. of benzoyl peroxide were added. The reaction mixture was then heated at 50° C. for an additional 16 hours. The precipitated polymer was obtained in 93 per cent yield and contained 17 per cent by weight of N-methylacrylamide on analysis.

Fibers spun by extruding a solution of the polymer product obtained above in N,N-dimethylacetamide into a precipitating bath had a softening point of 190° C. and showed excellent affinity for dyes.

Example 6

1.0 g. of vinyl acetate and 1.0 g. of methyl methacrylate were suspended in 18 cc. of distilled water containing 0.02 g. of ammonium persulfate, 0.02 g. of sodium bisulfite and 1.1 g. of Triton 720 (a sulfonated ether). The resulting emulsion was then heated at 50° C. for 16 hours. After cooling to room temperature, a dispersion of 8.0 g. of acrylonitrile, 0.1 g. of ammonium persulfate, 0.1 g. of sodium bisulfite, and 1.0 g. of Triton 720 (a sulfonated ether) in 50 cc. of distilled water was added. The reaction mixture was then tumbled at 50° C. for 12 hours. The precipitated polymer weighed 9.7 g. (97 per cent yield) and contained 9 per cent by weight of methyl methacrylate and 10 per cent by weight of vinyl acetate on analysis.

Fibers spun by extruding a solution of the polymer product in N,N-dimethylformamide into a precipitating bath had a softening point of 185° C. and showed good dye affinity.

Example 7

2.0 g. of vinyl acetate and 1.0 of isopropenyl acetate were suspended in 20 cc. of distilled water containing 0.02 g. of ammonium persulfate, 0.02 g. of sodium bisulfite, and 1.1 g. of Triton 720 (a sulfonated ether). The resulting emulsion was then heated at 50° C. for 16 hours. After cooling to room temperature, a dispersion of 7.0 g. of acrylonitrile, 0.1 g. of ammonium persulfate, 0.1 g. of sodium bisulfite, and 1.0 g. of Triton 720 (a sulfonated ether) in 50 cc. was added. The dispersion was tumbled end over end at 50° C. for an additional 12 hours. The precipitated polymer weighed 9.2 g. (92 per cent yield) and contained 9.0 per cent by weight of isopropenyl acetate and 17.0 per cent by weight of vinyl acetate by analysis.

Fibers spun by extruding a solution of the polymer product in N,N-dimethylformamide into a precipitating bath had a softening point of 195° C. and showed good dye affinity.

Example 8

3.0 g. of methyl α-acetaminoacrylate and 2.0 g. of acrylonitrile were added to a solution of 0.05 g. of ammonium persulfate and 0.05 g. of sodium bisulfite in 75 cc. of distilled water. The reaction mixture was then heated at 35° C. for 8 hours. After cooling to room temperature, 5.0 g. of acrylonitrile, 0.05 g. of ammonium persulfate and 0.05 g. of sodium bisulfite were added, and heating was continued for 8 hours at 35° C. The resulting polymer was obtained in a 93 per cent yield, and contained 29 per cent by weight of methyl α-acetaminoacrylate by analysis.

Fibers spun by extruding a solution of this polymer product in N,N-dimethylformamide into a precipitating bath had a softening point of 235° C. and showed excellent affinity for dyes.

Example 9

1.0 g. of acrylonitrile and 3.0 g. of N-methylmethacrylamide were dissolved in 50 cc. of distilled water containing 0.04 g. of potassium bisulfite and 0.04 g. of ammonium persulfate. The resulting solution was heated for 16 hours at 25° C. and cooled to room temperature. Then 6.0 g. of acrylonitrile were added along with 0.06 g. of potassium bisulfite. The reaction mixture was allowed to stand for 48 hours at room temperature. The precipitated product was then filtered off, washed several times with fresh portions of distilled water, and dried. There were thus obtained 6.2 g. of polymer containing 16 per cent by weight of N-methylmethacrylamide. Fibers prepared from this polymer had a high softening point and showed good affinity.

Example 10

5.0 g. of N-isopropylmethacrylamide and 1.0 g. of N,N-dimethylitaconamide were added to 50 cc. of acetonitrile containing 0.1 g. of benzoyl peroxide. The resulting solution was heated for 16 hours at 50° C. and cooled to room temperature. There were then added 1.0 g. of acrylonitrile and 0.01 g. of benzoyl peroxide, and the reaction mixture heated for an additional 12 hours at 50° C. The product was filtered off, washed with distilled water, and dried. The dried product contained 16.2 percent by weight of acrylonitrile, and a stable homogeneous solution resulted when the product was dissolved in N,N-dimethylacetamide containing polyacrylonitrile.

Example 11

5.0 g. of vinyl acetate and 5.0 g. of methyl methacrylate were suspended in 75 cc. of distilled water containing 0.1 g. of ammonium persulfate, 0.1 g. of sodium bisulfite, and 4.0 g. of Triton 720 (a sulfonated ether). The resulting emulsion was heated at 50° C. for 16 hours. After cooling to room temperature, 2.0 g. of acrylonitrile, 0.01 g. of ammonium persulfate, and 0.01 g. of sodium bisulfite were added. The reaction mixture was then tumbled end over end for 12 hours at 50° C. The product was filtered off, washed with water, and dried. It contained 6 percent by weight of acrylonitrile by analysis and formed homogeneous solutions in N,N-dimethylformamide with polyacrylonitrile.

Example 12

8.0 g. of N-isopropylacrylamide and 2.0 g. of acrylonitrile were suspended in 150 cc. of distilled water containing 1.5 cc. of 7-ethyl-2-methyl-undecan-4-sulfonic acid sodium salt (Tergitol No. 4), 0.10 g. of ammonium persulfate, and 0.10 g. of sodium metabisulfite. After tumbling the reaction mixture in a crown-cap bottle for 20 hours in a water bath heated to 35° C., the resulting emulsion was diluted to 230 cc. with distilled water and 23.0 g. of acrylonitrile were added along with 1.5 cc. of 7-ethyl-2-methyl-undecan-4-sulfonic acid sodium salt (Tergitol No. 4), 0.23 g. of ammonium persulfate, 0.23 g. of sodium metabisulfite, and 1.35 g. of 85 percent phosphoric acid. The reaction mixture was then heated for an additional 8 hours at 35° C. with tumbling, cooled to room temperature, and the polymer product precipitated by the addition of a saturated sodium chloride solution to the reaction vessel. The polymer was filtered off, washed twice with hot water, and then dried. The yield amounted to 31.3 g., and the product was found to contain 23.0 percent by weight of N-isopropylacrylamide on analysis. It gave homogeneous solution in N,N-dimethylformamide.

The polymer products of our invention containing from 60 to 90 percent by weight of acrylonitrile in the polymer molecule are especially useful in preparing synthetic fibers as has been shown above. In preparing the preformed interpolymers used to obtain the final products, we have found that interpolymerizing two monoethylenically unsaturated compounds containing the group represented by Formula VII above, and which are free from cyano (—CN) groups, gives advantageous results provided at least one of said compounds contains an amido nitrogen

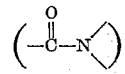

atom, and the amounts of the said compounds are varied so that each of the said compounds represents at least 5 percent but not more than 95 per cent of their combined weights. Sufficient acrylonitrile is then added upon completion of the interpolymerization to give a final product containing from 60 to 90 per cent by weight of acrylonitrile in the polymer molecule. Such final products may be designated ternary interpolymers.

Other solvents which can be used for the preparation of fibers from the new polymers of our invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 per cent by weight.

Instead of using an aqueous medium as is disclosed in a number of the above examples, it is possible to use organic solvents, such as the acetonitrile used in Example 10, aromatic hydrocarbons, such as benzene, toluene, etc., liquid alkanes, such as n-heptane, etc., aliphatic ethers, acetone, etc. As noted above, organic solvents which are water soluble can be used along with water in the polymerization. The term dispersion as used herein is intended to include both true solutions and emulsions.

What we claim as our invention and desire secured by Letters Patent of the United States is:

1. A process for preparing resinous compositions comprising heating in the presence of a polymerization catalyst a dispersion containing as the sole polymerizable monomers from 1 to 10 parts by weight of a monoethylenically unsaturated, polymerizable, organic compound containing a

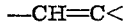

group and from 1 to 10 parts by weight of a different monomeric compound selected from the group consisting of those represented by the following general formulas:

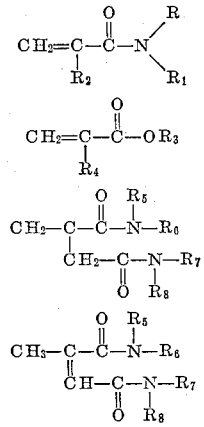

and

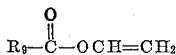

wherein R and $R_1$ each represents a member selected from the group consisting of a hydrogen atom and an alkyl group containing from 1 to 4 carbon atoms, $R_2$ represents a member selected from the group consisting of a hydrogen atom and a methyl group, $R_3$ represents an alkyl group containing from 1 to 4 carbon atoms, $R_4$ represents a member selected from the group consisting of a hydrogen atom, a methyl group, an acylamino group wherein the acyl group is the acyl group of a saturated aliphatic carboxylic acid containing from 2 to 4 carbon atoms, and a carbalkoxylamino group wherein the alkoxyl group contains from 1 to 4 carbon atoms, $R_5$, $R_6$, $R_7$, and $R_8$ each represents a member selected from the group consisting of a hydrogen atom, a methyl group, and an ethyl group, and $R_9$ represents a member selected from the group consisting of a hydrogen atom and an alkyl group containing from 1 to 3 carbon atoms, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

2. A process for preparing resinous compositions comprising heating in the presence of a peroxide polymerization catalyst an aqueous dispersion containing as the sole polymerizable monomers from 1 to 10 parts by weight of N-isopropylacrylamide and from 1 to 10 parts by weight of a different monoethylenically unsaturated organic compound containing a

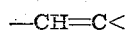

group, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

3. A process for preparing resinous compositions comprising heating in the presence of a peroxide polymerization catalyst an aqueous dispersion containing as the sole polymerizable monomers from 1 to 10 parts by weight of N-methylmethacrylamide and from 1 to 10 parts by weight of a different monoethylenically unsaturated organic compound containing a

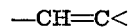

group, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

4. A process for preparing resinous compositions comprising heating in the presence of a peroxide polymerization catalyst an aqueous dispersion containing as the sole polymerizable monomers from 1 to 10 parts by weight of methyl methacrylate from 1 to 10 parts by weight of a different monoethylenically unsaturated organic compound containing a

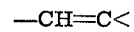

group, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

5. A process for preparing resinous compositions comprising heating in the presence of a peroxide polymerization catalyst an aqueous dispersion containing as the sole polymerizable monomers from 1 to 10 parts by weight of N,N-dimethylitaconamide and from 1 to 10 parts by weight of a different monoethylenically unsaturated organic compound containing a

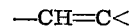

group, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

6. A process for preparing resinous compositions comprising heating in the presence of a peroxide polymerization catalyst an aqueous dispersion containing as the sole polymerizable monomers from 1 to 10 parts by weight of vinyl acetate and from 1 to 10 parts by weight of a different monoethylenically unsaturated organic compound containing a

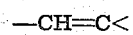

group, until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

7. A process for preparing resinous compositions comprising heating in the presence of a peroxide polymerization catalyst an aqueous dispersion containing as the sole polymerizable monomers from 1 to 10 parts by weight of N-isopropylacrylamide and from 1 to 10 parts by weight of acrylonitrile until interpolymerization is substantially complete, adding from 1 to 20 parts of acrylonitrile to the reaction mixture containing the resulting, unseparated interpolymer, and heating the mixture until polymerization is substantially complete.

8. A process for preparing resinous compositions comprising heating in the presence of a peroxide polymerization catalyst an aqueous dispersion containing as the sole polymerizable monomers from 1 to 10 parts by weight of N-methylmethacrylamide and from 1 to 10 parts by weight of acrylonitrile until interpolymerization is substantially complete, adding from 1 to 20 parts of acrylonitrile to the reaction mixture containing the resulting, unseparated interpolymer, and heating the mixture until polymerization is substantially complete.

9. A process for preparing resinous compositions comprising heating in the presence of a peroxide polymerization catalyst an aqueous dispersion containing as the sole polymerizable monomers from 1 to 10 parts by weight of methyl methacrylate and from 1 to 10 parts by weight of N-methylacrylamide until interpolymerization is substantially complete, adding from 1 to 20 parts by weight of acrylonitrile to the reaction mixture containing the resulting, unseparated interpolymer, and heating the mixture until polymerization of the acrylonitrile is substantially complete.

10. A process for preparing resinous compositions comprising heating in the presence of a peroxide polymerization catalyst an aqueous dispersion containing as the sole polymerizable monomers from 1 to 10 parts by weight of N,N-dimethylitaconamide and from 1 to 10 parts by weight of N-isopropylmethacrylamide until interpolymerization is substantially complete, adding from 1 to 20 parts by weight of acrylonitrile to the reaction mixture containing the resulting, unseparated interpolymer, and heating the mixture until the added acrylonitrile has substantially completely polymerized.

11. A process for preparing resinous compositions comprising heating in the presence of a peroxide polymerization catalyst an aqueous dispersion containing as the sole polymerizable monomers from 1 to 10 parts by weight of methyl methacrylate and from 1 to 10 parts by weight of vinyl acetate until interpolymerization is substantially complete, adding from 1 to 20 parts by weight of acrylonitrile to the reaction mixture containing the resulting, unseparated interpolymer, and heating the mixture until polymerization of the acrylonitrile is substantially complete.

12. A process for preparing resinous compositions comprising heating in the presence of a peroxide polymerization catalyst an aqueous dispersion containing as the sole polymerizable monomers from 5 to 95% by weight of a monoethylenically unsaturated, polymerizable organic compound free from cyano groups and containing a $$CH_2=C<$$

group and from 95 to 5 per cent by weight of a different monoethylenically unsaturated polymerizable organic compound free from cyano groups and containing a $$CH_2=C<$$

group, the weight percentages being based on the combined weights of the said polymerizable compounds, and at least one of said polymerizable organic compounds containing an amido nitrogen atom, until interpolymerization is substantially complete, adding from 60 to 90 per cent by weight of acrylonitrile to the reaction mixture containing the resulting, unseparated interpolymer, based on the total weight of monoethylenically unsaturated, polymerizable organic compounds containing a $$CH_2=C<$$

group employed in the polymerization, and heating the mixture until the added acrylonitrile has substantially completely polymerized.

13. The products obtained by the process of claim 1.

14. The products obtained by the process of claim 2.

15. The products obtained by the process of claim 3.

16. The products obtained by the process of claim 4.

17. The products obtained by the process of claim 5.

18. The products obtained by the process of claim 6.

HARRY W. COOVER, JR.
JOSEPH B. DICKEY.

References Cited in the file of this patent

UNITED STATES PATENTS

| Number | Name | Date |
|---|---|---|
| 2,476,474 | Baer | July 19, 1949 |
| 2,511,811 | Baer | June 13, 1950 |
| 2,531,408 | D'Alelio | Nov. 28, 1950 |
| 2,538,779 | Harrison et al. | Jan. 23, 1951 |